United States Patent [19]

Lankenau

[11] 4,265,701

[45] May 5, 1981

[54] LIQUID CONCENTRATION METHOD

[75] Inventor: Henry G. Lankenau, Fort Myers, Fla.

[73] Assignee: Ecodyne Corporation, Lincolnshire, Ill.

[21] Appl. No.: 110,417

[22] Filed: Jan. 7, 1980

[51] Int. Cl.³ .............................................. B01D 1/28
[52] U.S. Cl. ...................... 159/47 WL; 159/DIG. 13;
159/17 R; 165/106; 165/108; 202/DIG. 1;
203/11; 203/7; 210/696
[58] Field of Search ............................... 165/106, 108;
159/DIG. 13, 17 R, 17 P, 17 VS, 17 C, 18, 20
R, 20 CS, 47 WL; 202/174, DIG. 1; 203/6, 7,
10, 11; 210/57

[56] References Cited

U.S. PATENT DOCUMENTS

| | | | |
|---|---|---|---|
| 1,600,106 | 9/1926 | Fothergill | 159/11 |
| 1,771,810 | 7/1930 | Morterud | 159/11 |
| 2,769,489 | 11/1956 | Eckstrom | 159/24 |
| 3,165,435 | 1/1965 | Henszey | 159/47 |
| 3,323,575 | 6/1967 | Greenfield | 159/13 |
| 3,326,266 | 6/1967 | Braithwaite et al. | 159/11 |
| 3,425,477 | 2/1969 | Farin | 159/48 |
| 3,558,438 | 1/1971 | Schoenbeck | 203/26 |
| 3,921,918 | 11/1975 | Peterson | 241/28 |
| 4,193,446 | 3/1980 | Greis et al. | 165/108 |

OTHER PUBLICATIONS

"Chemical Engineer's Handbook"; 4th vol., Perry; pp. 11-24 to 11-29.

Primary Examiner—Frank Sever
Attorney, Agent, or Firm—Charles M. Kaplan; Joel E. Siegel

[57] ABSTRACT

An evaporator for increasing the solids content of a liquid-solids mixture employs vapor compressor means to recycle superheated vapors that are boiled off the mixture by a heat transfer fluid. The super-heated vapors are forced into the mixture before the mixture is heated by passage over a heat transfer surface, and the vapors cause the mixture to flow past such heat transfer surface at sufficient velocity to prevent excessive solids from depositing on the heat transfer surface.

9 Claims, 3 Drawing Figures

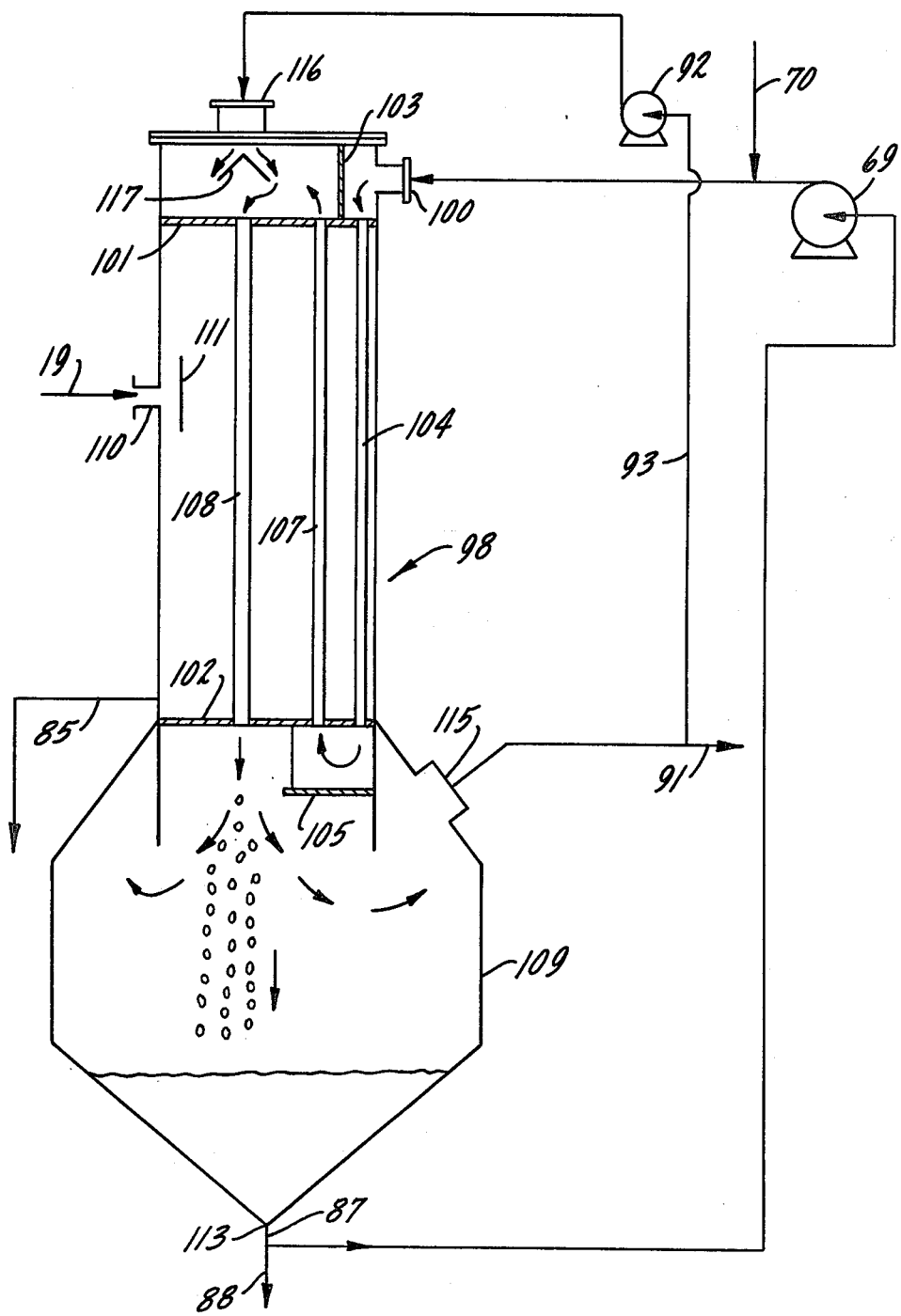

LIQUID CONCENTRATION METHOD

BACKGROUND OF THE INVENTION

This invention relates to the concentration or evaporation of liquids, and more particularly to methods and apparatus for increasing the solids content of liquid-solids mixtures.

When industrial wastes are being processed, it is usually beneficial to increase the solids content of any liquid being disposed of. This is particularly true for pulp and paper mill liquid wastes, which ordinarily have a final solids content of up to about 63%. Attempts to increase the solids content of such wastes have involved increasing the number of heat transfer tubes used in conventional evaporation apparatus and processes in order to increase the energy applied to any given volume of liquid waste. It has been discovered that as more of such tubes are used to process a given volume of liquid waste, a point is reached at which the salts from the waste, such as calcium and/or sodium sulfate, that plate out on the heat transfer tubes become the limiting factor in the efficiency of the process.

DESCRIPTION OF THE DRAWINGS

Accordingly, it is an object of this invention to provide improved methods and apparatus for evaporating or concentrating liquids.

Another object is to recycle superheated vapors in liquid concentrating apparatus so as to increase the velocity at which a liquid-solid mixture passes through heat transfer tubes in such a concentrator.

Figure 1:
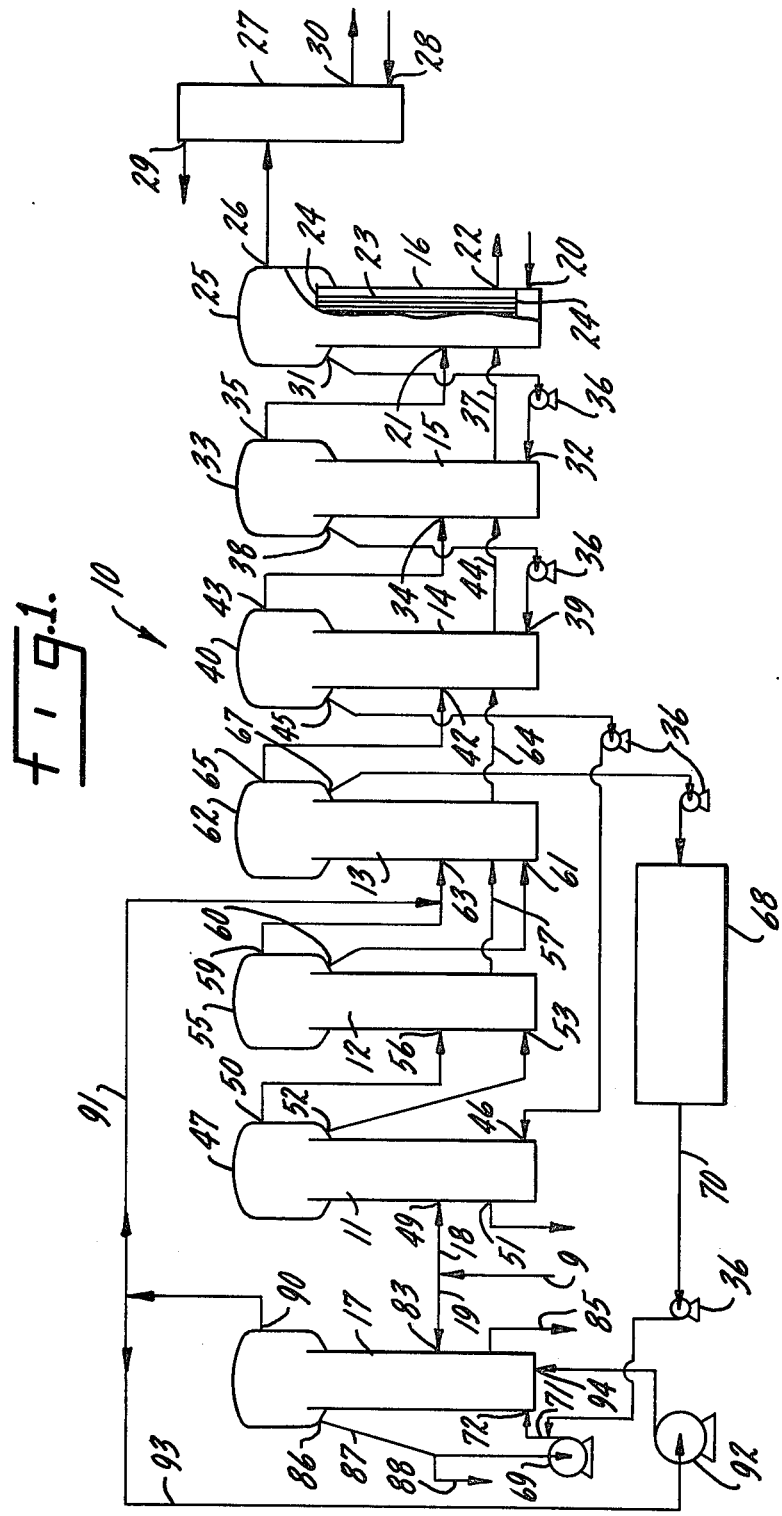

Another object is to significantly increase the specific gravity or solids content of pulp and paper mill waste.

Another object is to prevent the deposition of solids on the heat transfer surfaces of liquid evaporators.

Another object is to increase the velocity of the fluids passing through an evaporator by compressing gasses.

Another object is to evaporate at high velocity liquid pulp and paper mill wastes without consuming excessive amounts of energy.

Another object is to provide relatively simply, low-cost, durable apparatus and methods for concentrating liquid waste that are energy-efficient, easily maintained and which do not possess defects found in similar prior art systems.

Another object is to provide a multiple effect evaporator for pulp and paper mill wastes in which heated vapors from a concentrator are recycled into an effect that operates closer to the high temperature end of the system than is possible in the prior art.

Other objects and advantages of the invention will be apparent from the specification and claims, and the scope of the invention will be set forth in the claims.

BRIEF DESCRIPTION OF THE DRAWING

FIG. 1 is a schematic representation of a multiple effect evaporator in accord with this invention.

Figure 2:
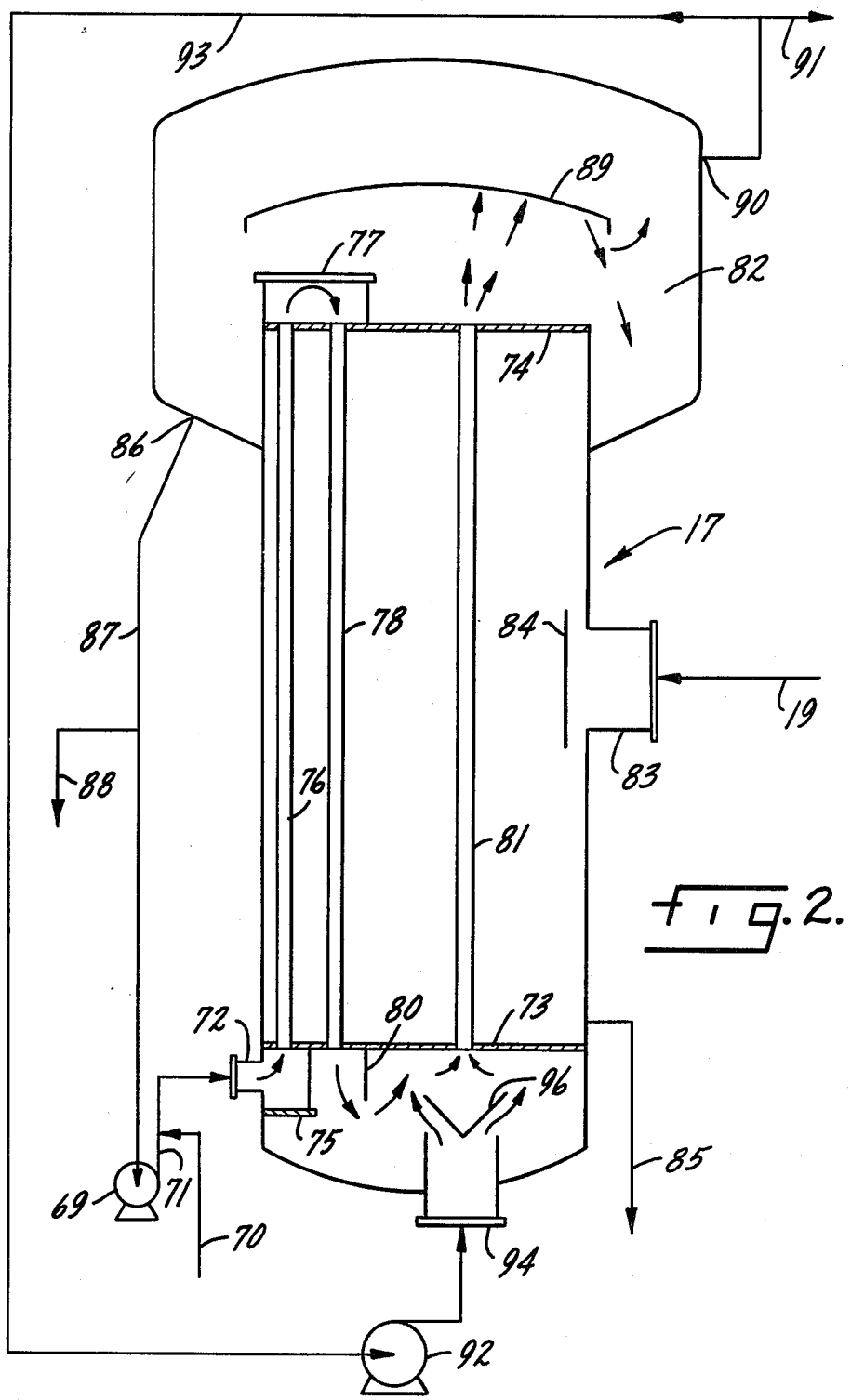

FIG. 2 is an enlarged, schematic, cross sectional representation of the concentrator for the evaporator in FIG. 1.

FIG. 3 is an enlarged, schematic, cross sectional representation, corresponding to FIG. 2, of another type of concentrator used to practice the invention.

DESCRIPTION OF THE INVENTION

The drawing shows a multiple effect liquid evaporator 10 of the rising film type for increasing the solids content of pulp and paper mill wastes. Six similar evaporator effects numbered 11–16 are interconnected with each other and with an evaporator concentrator 17. A heat transfer fluid, such as steam from a source 9, enters effect 11 and concentrator 17 through lines 18 and 19. Effect 11 and concentrator 17 operate at the highest temperature (e.g. 287° F.), and effect 16 operates at the lowest temperature (e.g. 154° F.). The temperature of the effects progressively decreases between effects 11 and 16, as determined by the operating conditions of evaporator 10. The liquid-solids mixture being concentrated is forced under pressure by conventional means into effect 16 through an inlet 20 at the entrance end. The heated vapor from effect 15 serves as the heat transfer fluid for effect 16 and enters it through a heated vapor inlet at 21; the liquid which forms when such vapors condense exits through an outlet at 22 and may be disposed of in any conventional manner. The liquid-solid mixture passes from inlet 20 past a heat transfer surface, such as vertical tubes 23 held in tube sheets 24, heated by the vapor from effect 15, and into an enlarged chamber 25 at the discharge end of effect 16. The vapors resulting from heating of the incoming mixture exit through an outlet at 26 and pass through a conventional condenser 27 where they are chilled until they condense into a disposable or recyclable liquid by cold water entering at 28 and leaving at 29; the liquid condensate leaves condenser 27 at 30. Since some of the liquid was evaporated from the incoming liquid-solids mixture as it passed through effect 16 into chamber 25, the liquid-solids mixture exiting through an outlet at 31 is relatively more concentrated. The mixture leaves the outlet at 31 and passes to an inlet at 32 of effect 15, and then past a heat transfer surface and into an enlarged chamber 33 at the outlet end of effect 15. The heated vapors from effect 14 enter at 34 and provide the heat transfer fluid for causing effect 15 to operate at a higher temperature (e.g. 178° F.) than effect 16. The vapors which boil off the mixture as it passes through effect 15 exit through an outlet at 35 from which they enter effect 16. Conventional pump means 36 should be used wherever pumping pressure is needed. The vapors which condense in effect 15 pass into effect 16 through a line 37. The heated, more concentrated mixture leaves effect 15 through an outlet at 38 and enters effect 14 at an inlet at 39 and then moves past a heat transfer surface and into an enlarged chamber 40 at the outlet end of effect 14. The heated vapors from effect 13 enter at 42 and provide the heat transfer fluid for causing effect 14 to operate at a higher temperature (e.g. 202° F.) than effect 15. The vapors which boil off the mixture as it passes through effect 14 exit through an outlet at 43. The vapors which condense in effect 14 pass into effect 15 through line 44.

The heated, more concentrated mixture leaves effect 14 through an outlet at 45 and enters effect 11 at an inlet at 46 and then moves past a heat transfer surface and into an enlarged chamber 47 at the outlet end of effect 11. The steam from line 18 enters at 49 and provides the heat transfer fluid for effect 11. The vapors which boil off the mixture as it passes through effect 11 exit through an outlet at 50. The steam which condenses in effect 11 exits at 51 and may be recycled or disposed of in conventional manner. The heated, more concentrated mixture leaves effect 11 through an outlet at 52 and enters effect 12 at an inlet at 53, and then moves past a heat transfer surface and into an enlarged chamber 55 at the outlet end of effect 12. The heated vapors from effect 11 enter effect 12 at 56, and the condensate from such vapors passes into effect 13 through a line 57. The vapors which boil off the mixture as it passes through effect 12 exit through an outlet at 59. The heated, more concentrated mixture leaves effect 12 through an outlet at 60 and enters effect 13 at an inlet at 61, and then moves past a heat transfer surface and into an enlarged chamber 62 at the outlet end of effect 13. The heated vapors from effect 12 and, as explained hereinafter, the heated vapors from concentrator 17 enter effect 13 at 63 and provide the heat transfer fluid for effect 13; the condensate from such vapors passes into effect 14 through a line 64. The vapors which boil off the mixture as it passes through effect 13 exit through an outlet at 65. Effect 13 operates at a lower temperature (e.g. 226° F.) than that of effect 12 (e.g. 249° F.).

The heated, more concentrated liquid-solid mixture leaves effect 13 through an outlet at 67 and flows into an intermediate storage container 68. The mixture in container 68 is transferred by pump means 36 through a line 70 to a line 71, where the stored mixture and recycled mixture from concentrator 17 are forced by circulation pump means 69 into an inlet 72 at the entrance end of concentrator 17. Several groups of essentially identical, vertically extending heat transfer tubes have their upper and lower ends held in tube sheets 73 and 74. The ends of each group of tubes are isolated from those of the tubes in other groups, and the ends of the various groups are connected so that the mixture flows through each group in series. The mixture flows into an entrance header 75 and through a first group 76 of such tubes. A return header 77 causes the mixture to pass downwardly in series through a second group 78 of heat transfer tubes. The mixture then flows past baffle means 80 beneath tube sheet 73 into a final group 81 of tubes through which the mixture, and vapors that have boiled from the mixture, flow upwardly into an enlarged chamber 82 at the discharge end of concentrator 17, where such heated vapors are collected. Means 69 is capable of pumping the mixture through final tube 81 at a predetermined first exit velocity (e.g. 16 ft./sec.). The heat transfer fluid (i.e. steam from line 19), enters concentrator 17 through an inlet 83, and may be deflected by baffle means 84. Final tube group 81 may be closest to steam inlet 83. Condensed steam collects on top of tube sheet 73 and is removed through line 85 for recycling or disposal. The heated mixture in its most concentrated state leaves chamber 82 at an outlet at 86 and passes through a line 87 to the input side of pump means 69 for recycling. When the concentration of solids in the mixture flowing through line 87 reaches the desired level (e.g. 75-80%), the final product may be withdrawn periodically or continuously through a line 88.

The vapors that boil off the mixture in concentrator 17 and flow through the tubes in group 81 into chamber 82 move past baffle means 89 and exit through an outlet at 90. Some of these vapors pass through a line 91 to the inlet at 63 of effect 13. The remaining vapors are recovered and drawn by pump or vapor compressor means 92 through a line 93, and are recycled through an inlet 94 at the entrance end of concentrator 17. Recycling of the vapors through compressor 92 raises their temperature until they are super heated (e.g. 275° F.). Inlet 94 is aligned with and below the lower end of tube series 81. The recycled vapors are superheated and are forced by means 92 at a second predetermined velocity against baffle means 96 where such superheated vapors mix with the liquid-solid-vapor mixture and cause it to move through tube group 81 at a much higher velocity (e.g. 35 ft./sec.) than means 69 is capable of producing. The exit velocity from tube group 81 achieved by recycling vapors with means 92 should be two or more times more than that which result from conventional pump means 69. When such mixture exit velocity is above about 20 feet per second, solids will not plate out on the inside of the tubes rapidly enough to jeopardize the efficiency of the system. The best overall results are achievable when the exit velocity is in the range of about 25-75 feet per second, and the most preferred exit velocity is usually in the range of about 30-50 feet per second. The increased velocity of the fluids passing through tube group 81 permits concentrator 17 to operate at a relatively high temperature without resulting in excessive deposit or plating of solids in the tubes. It also permits more tubes to be used for a given volume of liquid-solid mixture being processed, without decreasing the heat transfer efficiency of the evaporator. In addition, the resulting higher temperature of the vapors exiting from concentrator 17 enables such vapors to be used in an effect (e.g. 13) operating at a relatively high temperature, and this also increases the efficiency of the evaporator.

Each of effects 11-16 of evaporator 10 has been depicted as the rising film type, and therefore each such effect has essentially the same structure and manner of operation as concentrator 17, except that none of the effects has any device corresponding to recycle compressor means 92. Conventional accessories such as flow and pressure control valves; gauges; and timers, thermometers and other control devices should be used, but they have not been illustrated because their specific details are not part of the invention. In some systems container 68 may be eliminated, and the mixture may flow directly into evaporator 17 from effect 13. A centrifugal vapor compressor having a capacity of e.g. 5-10,000 A.C.F.M. would be suitable for use as compressor means 92.

The embodiment shown in FIG. 3 is identical to that shown in FIGS. 1 and 2, except that concentrator 98 is of the falling film type. Concentrator 98 may be connected into an evaporator with six effects and an intermediate storage container interconnected the same as illustrated in FIG. 1; the six effects may be either the rising film type corresponding to concentrator 17 or they may be the falling film type corresponding to FIG. 3. Identical components are identified by the same reference numbers in FIGS. 2 and 3.

The heated, relatively concentrated liquid-solid mixture from an evaporator effect corresponding to effect 13 in evaporator 10, or from an intermediate storage container such as 68, is forced through line 70 by pump means 36. Such mixture combined with the mixture passing through pump 69 is forced into an inlet 100 at the entrance end of concentrator 98. Several groups of serially connected heat transfer tubes have their ends held in tube sheets 101 and 102. The mixture flows into an entrance header 103 and passes downwardly through a first group 104 of such tubes. A return header 105 causes the mixture to pass upwardly through a second group 107 of heat transfer tubes. The mixture then flows into a final group 108 of tubes through which the mixture and the vapors that have been boiled from it flow downwardly into an enlarged chamber 109 at the discharge end of concentrator 98 where such heated vapors are collected. The heat transfer fluid (i.e. steam from line 19) enters through an inlet 110 and may be deflected by baffle means 111. Condensed steam collects on top of tube sheet 102 and is removed through line 85. The heated mixture in its most concentrated state leaves chamber 109 at an outlet at 113 and passes through a line 87 to the input side of means 69 for recycling. Line 88 is used to withdraw the final product either periodically or continuously when the desired solids concentration is reached.

The vapors that boil off the mixture into chamber 109 exit through an outlet 115. Some of these superheated vapors pass through a line 91 to the heat transfer fluid inlet of an evaporator effect such as 13. The remaining superheated vapors are recovered and drawn by pump or vapor compressor means 92 through a line 93, and are recycled through an inlet 116 at the entrance end of concentrator 98. Inlet 116 is aligned with and above the upper end of tube group 108. The recycled superheated vapors are pumped by means 92 at a predetermined velocity against baffle means 117 where such superheated vapors mix with the liquid-solid mixture and cause it to move through tube group 108 with a much higher velocity than is achievable from pump means 92, as explained in detail with reference to FIG. 2. The same benefits are therefore obtained for falling film concentrator 98 as were described with respect to rising film concentrator 17.

It has thus been shown that by the practice of this invention, an evaporator or concentrator uses vapor compressor means 92 to recycle superheated vapors, and this increases the velocity and temperature at which a liquid-solid mixture flows through heat transfer tube groups 81 and 108. This enables the apparatus to operate at a higher temperature and to employ more heat transfer tubes without causing excessive plating out of solids on the heat transfer surfaces. It also permits such heated vapors to be put back into the concentrator in an effect that operates at relatively high temperature (e.g. the third rather than the fourth highest temperature effect). This produces a high solids content (e.g. 75-80%) residue from pulp and paper mill waste without wasting energy.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. The process for increasing the solids content of a liquid-solids mixture by evaporation, comprising:
    A. passing said mixture from an entrance end to a discharge end of an concentrator;
    B. passing a high temperature fluid through said concentrator in heat transfer relationship with said mixture so as to convert some of the liquid of said mixture to a heated vapor and to concentrate the solids in the remaining liquid;
    C. removing said heated vapor from said concentrator;
    D. recovering at least some of the removed heated vapor;
    E. passing a sufficient amount of the recovered vapor into the entrance end of said concentrator so as to provide a predetermined fluid velocity through said concentrator sufficient to substantially prevent deposit of solids therewithin.

2. The invention defined in claim 1, wherein the solids content of said remaining liquid is above about 60%.

3. The invention defined in claim 2, wherein the solids content of said remaining liquid is below about 80%.

4. The invention defined in claim 1, wherein the specific gravity of said remaining liquid is in the range of about 1.3-1.4.

5. The invention defined in claim 1, wherein the recovered heated vapors are passed upwardly into the entrance end of said concentrator.

6. The invention defined in claim 1, wherein the recovered heated vapors are passed downwardly into the entrance end of said concentrator.

7. The method of preventing solids from depositing on a heat exchange surface of apparatus which increases the solids content of a liquid-solids mixture by evaporating liquid from said mixture thereby providing a vapor as it contacts said surface, comprising feeding a sufficient amount of said vapor into said mixture so as to provide a velocity greater than about 20 feet per second over said surface.

8. The invention defined in claim 7, wherein said velocity is between about 25 and 75 feet per second.

9. The invention defined in claim 8, wherein said velocity is between about 30 and 50 feet per second.

* * * * *